United States Patent

[11] 3,600,505

[72] Inventor Mouayed Edouard Dobouney
Dartford, England
[21] Appl. No. 876,497
[22] Filed Nov. 13, 1969
[45] Patented Aug. 17, 1971
[73] Assignee Crosfield Electronics Limited
London, England
[32] Priority Nov. 26, 1968
[33] Great Britain
[31] 56088/68

[54] COLOR CORRECTION APPARATUS FOR A COLOR PRINTER
10 Claims, 4 Drawing Figs.

[52] U.S. Cl. ........ 178/5.2 A
[51] Int. Cl. ........ H04n 9/53
[50] Field of Search ........ 178/5.2 A

*Primary Examiner*—Robert L. Griffin
*Assistant Examiner*—John C. Martin
*Attorney*—Kemon, Palmer & Estabrook

ABSTRACT: In apparatus for preparing color printer separation, color-component signals derived from an analyzing scanner are color-corrected before being used to modulate an exposing scanner. To permit better control of the color correction, the correction signals are derived by first applying pairs of uncorrected signals to differencing circuits which generate, for each pair, separate difference signals for differences of opposite polarities. Correction signals representing different restricted color ranges are then formed by adding, for each such restricted color range, an appropriate selection of the difference signals with suitable weighting and passing the resultant only if its polarity is such that an increase in its value corresponds to an increase in the color density of that restricted color range in the original. Finally, each uncorrected color-component signal is corrected with at least one of these correction signals.

Inventor
Monayed E. Dobauny
By
Kemon, Palmer & Estabrook
Attorneys

Inventor

Menayed E Kolacny

By

Kenyon, Palmer & Estabrook

Attorneys

Inventor
Mcuayed E. Estawny
By
Kenen, Vacner & Estabrook
Attorneys

Inventor

By

Attorneys

COLOR CORRECTION APPARATUS FOR A COLOR PRINTER

In one method of reproducing color images, the image is scanned by an analyzing head which includes color filters and photoelectric devices. These generate electric signals corresponding to the red, green, and blue components of the color image and each of these signals, after suitable correction, is used to control the exposure of a film from which the corresponding color printer is made.

Color correction is necessary because the yellow, magenta, and cyan printer inks are not complementary to the blue, green and red filters. Thus, an ink which should absorb all of one color component may instead reflect a proportion of this component and to this extent acts like a second of the three inks. Consequently, wherever the first ink occurs, the second ink must be reduced in weight in proportion to the amount of the first ink. This is known as single stage masking. A complication known as "additivity failure" makes it necessary to apply a further stage of correction.

It will be realized that because of the complex corrections applied, the adjustment of a color scanner is very critical and the adjustment of one color may affect the reproduction of other colors in an undesirably way.

According to the present invention, the apparatus further includes differencing circuits arranged to derive, for at least two pairs of uncorrected signals, a first difference signal representing an excess of a first of the pair of uncorrected signals over the second of the pair and a second difference signal representing an excess of the second of the pair of uncorrected signals over the first; signal-combining means for deriving correction signals representing different restricted color ranges by forming for each such restricted color range a weighted-sum of at least two of the said difference signals and selecting the weighted-sum signal only when it has a polarity such that an increase in the weighted-sum represents an increase in the color density of the said restricted color range of the original; and means for correcting at least two of the said uncorrected color printer signals with at least one of the correction signals and for using the corrected signal in the modulation of a light source by means of which a light-sensitive surface is scanned and exposed.

By the expression "restricted color range" we mean a range of color which is predominantly of one hue. Examples of restricted color ranges used in the preferred form of apparatus are green, red, yellow, cyan, violet and magenta.

By separately deriving the difference signals for the different pairs of color component signals and furthermore separately deriving for each pair the signals representing the "positive" and "negative" differences, it becomes possible to include for each of the color printer channels boost controls for the printer color in question and for the overprints of this printer color and each of the other printer colors, together with controls for the other two printer colors and for the overprint of these two colors. Advantageously, the six circuits generating the three printer colors and the three overprints of pairs of printer colors may be used for each of the three color channels.

Considering the yellow printer color channel, the correction equation can be expressed by $y' = y + p$ green $+ q$ red $+ s$ yellow $+ t$ cyan $+ r$ violet $+ z$ magenta in which $y$ and $y'$ are the uncorrected and corrected yellow signals. There may be separate circuits and controls for each of the colors yellow, green, red, cyan, violet and magenta. The yellow, green and red controls are used principally for boosting yellow in areas of these colors and the cyan, violet and magenta controls are used for reducing yellow to zero (or if desired permitting some small amount of yellow) in areas of these colors. The coefficients $p, q, s, t, r$, and $z$ are adjusted to give the desired amount of color correction or boost and the single colors are derived in a selective way so as to effect a desired portion of the color spectrum. There are similar equations for $m'$ and $c'$.

The following mathematical functions are conveniently used in describing the method of generation of the six color signals in the above equation.

$P$ and $N$ are limit functions defined by:

$P(x) \equiv 0 \quad X<0$ $P(x) \equiv X \quad X \geq 0$ $N(x) \equiv 0 \quad X>0$ $N(x) \equiv X \quad X \leq 0$ The following identities hold in respect of these functions:

$P(x) \equiv -N(-x)$ $N(x) \equiv -P(-x)$ $P(x)+N(x) \equiv (x)$

The manner in which the corrections signals are derived will be clear from the following example.

A magenta correction signal M is to be generated whenever $m>y$ and $m>c$. It is to be equal to the amount by which $m$ exceeds the larger of the other two signals.

Thus $M=m-$(largest of $y$ or $c$) provided result is positive $=P[m-$(largest of $y$ or $c$)]

It follows from definition of $P(x)$ that (largest of $y$ or $c$)$=y+P(c-y)$ $\therefore M=P[m-(y+P(c-y))]$ $M=P[m-y+N(y-c)]$ using the identity $P(x)=-N(-x)$ Yellow and cyan correction signals are derived in a similar way. Green, red and violet signals are derived in a complementary way, being the amount by which one signal is smaller than the least of the other two. In practice, we provide an additional term in the green signal for better correction.

In order that the invention may be better understood, an example of apparatus embodying the invention will now be described with reference to the following drawings, in which.

Figure 1:
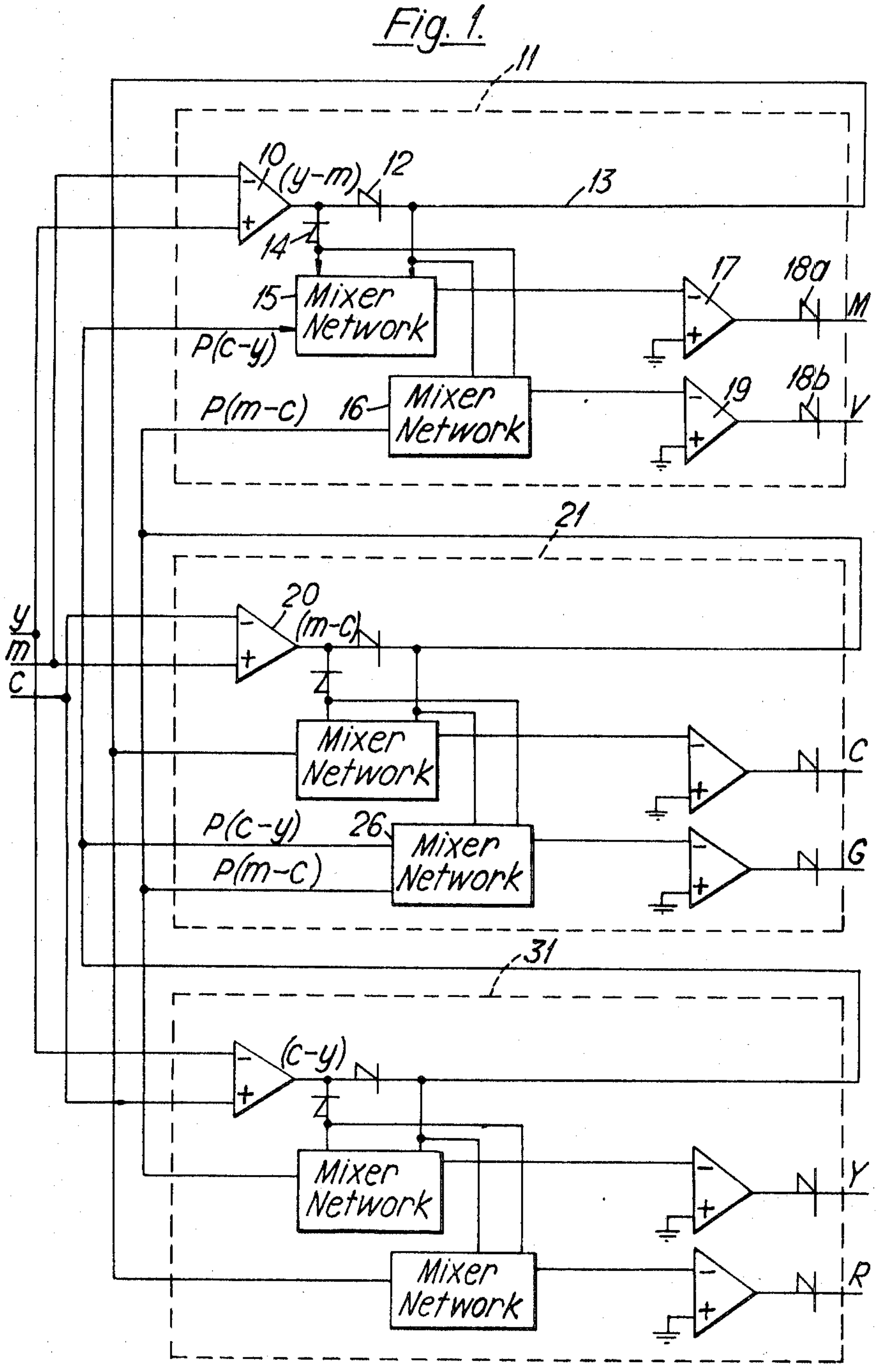
FIG. 1 is a block diagram of the circuits for generating the correction signals for the six colors.

In FIG. 1, the uncorrected yellow and magenta signals are applied to a first differential amplifier 10 in a color correction function generator 11. This differential amplifier is in the form of an integrated circuit and generates at its output a signal representing the function $(y-m)$. If this signal is positive it passes through a rectifier 14 and is applied to each of two mixer networks 15 and 16. These mixer networks also receive the positive output of the rectifier 12.

In similar manner, the magenta and cyan signals are applied to the noninverting and inverting inputs of a differential amplifier 20 in a color correction function generator 21, the output of which represents $(m-c)$. As in the case of the function generator 11, positive and negative signals are applied to two mixer a network and the positioned difference signal is also applied to an output terminal of the color correction function generator. A third function generator 31 performs the same function for the cyan and yellow signals providing positive and negative signals representing the difference $(c-y)$.

The positive difference signal from each function generator forms an input to a mixer network in each of the other function generators. Thus, in the case of the function generator 11, an input to the mixer network 15 is provided by the signal $P(c-y)$ from the output of the function generator 31. Similarly, an input to the mixer network 16 is supplied with the signal $P(m-c)$ from the output of the function generator 21.

The mixer network 15 thus receives three input signals that generate an output signal representing their sum:

$$P(y-m)+N(y-m)+P(c-y)$$

Since the addition of the positive and negative functions of the difference $(y-m)$ is equal to $(y-m)$, and since the addition of the positive function $P(c-y)$ is equal to the subtraction of the negative difference $N(y-c)$, the above equation reduces to:

$$(y-m)-N(y-c)$$

This signal is applied to the inverting input of the differential amplifier 17, the noninverting input of which is earthed. Consequently the output of this amplifier is:

$$(m-y)+NCy-c)$$

Since there is a rectifier 18*a* in the output path of this amplifier, directed to pass positive signals, the signal which appears at the output terminal as the magenta correction signal is:

$$P[(my)+N(y-c)]$$

In a similar manner, it can be shown that the output of the mixer network 16 is;

$$(y-m)-N(c-m)$$

This is applied to the inverting input of the differential amplifier 19, the noninverting input of which is earthed, and the signal which appears at the output side of the rectifier 18*b* is:

$$P[(my)+N(c-m)]$$

This is the violet correction signal.

In a similar manner, the cyan correction signal appearing at the upper output of the function generator 21 is given by:

$$P[(cm)+N(m-y)]$$

The green correction signal at the second output of the function generator 21 is slightly more complicated. The mixer network 26 receives a signal P($m-c$) as well as the signal P($c-y$). The green correction signal is:

$$P[(cm)+N(y-c)-P(m-c)]$$

Finally, the yellow and red correction signals at the output of the function generator 31 are given, respectively, by: P[($y-c$)+N($A$ GE$M$)]

$$P[(yc)+N(m-y)]$$

Figure 2:
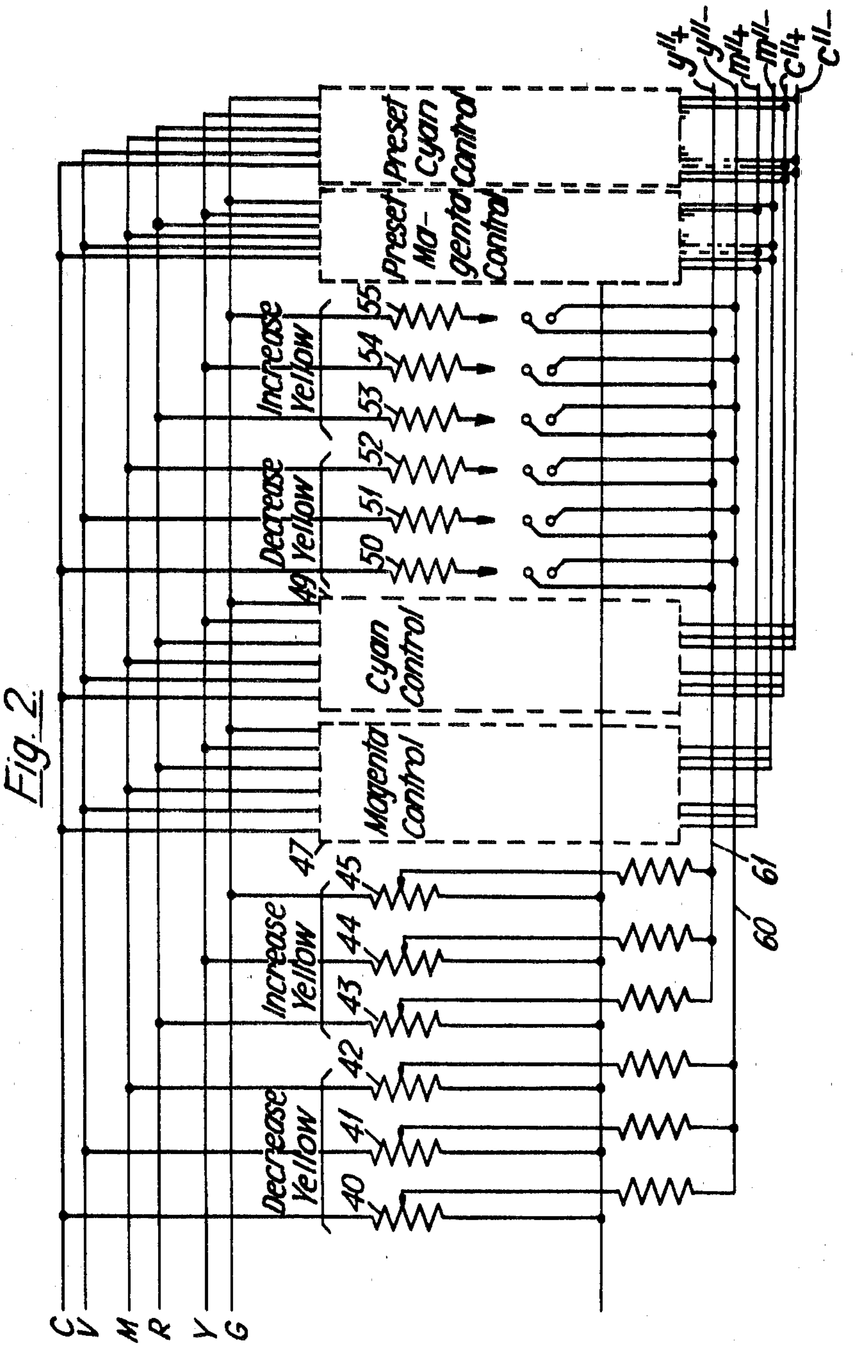
FIG. 2 shows the circuits for adjusting the amount of yellow, magenta and cyan.

The six correction signals are applied across potentiometers in the manner shown in FIG. 2, in which only the yellow channel is shown in full.

In the yellow channel, the cyan, violet and magenta correction signals are applied across potentiometers 40, 41 and 42 and the red, yellow and green correction signals are applied across potentiometers 43, 44 and 45 respectively. Clockwise rotation of the potentiometers 40, 41 and 42 tends to decrease yellow in the cyan, violet and magenta areas. Clockwise rotation of the potentiometers 43, 44 and 45 tends to boost yellow in the red, yellow and green areas. Six potentiometers similarly connected to the six input lines are provided in the magenta control section 47, the only difference being that in this case the three potentiometers connected to the cyan, yellow and green input lines are arranged so that clockwise rotation decreases the magenta in these terms and the three potentiometers connected to the violet, red and magenta input lines are connected so that clockwise rotation boosts magenta. These are six similar potentiometers for cyan in the cyan control section 49.

These potentiometers permit the operator to vary the corrections applied until his subjective assessment indicates the result to be satisfactory. However, an operator must have considerable experience to manipulate the controls intelligently and to facilitate his task in the apparatus which is being described these adjustable resistors are connected in parallel with fixed resistors selected when the apparatus is installed. The connections are such that each adjustable resistor gives an adjustment symmetrically about a mean value determined by the parallel-selected resistor. With this arrangement, the operator is able to deviate from the preset position but can go back to the standard setting with certainty and very speedily.

Thus, in FIG. 2, six resistors 50 to 55 are connected in parallel with the resistors 40 to 45. The resistors 50 to 55 are mounted in a plug-in board and each is connected to one of the output conductors of FIG. 2, the selected output conductor being that which is appropriate for the effect desired. For example, if resistor 50 is connected to conductor 60 its effect will augment that of control 40, while if it is connected to conductor 61 it will have the reverse effect. The remaining resistors operate in a similar manner.

Figure 3:
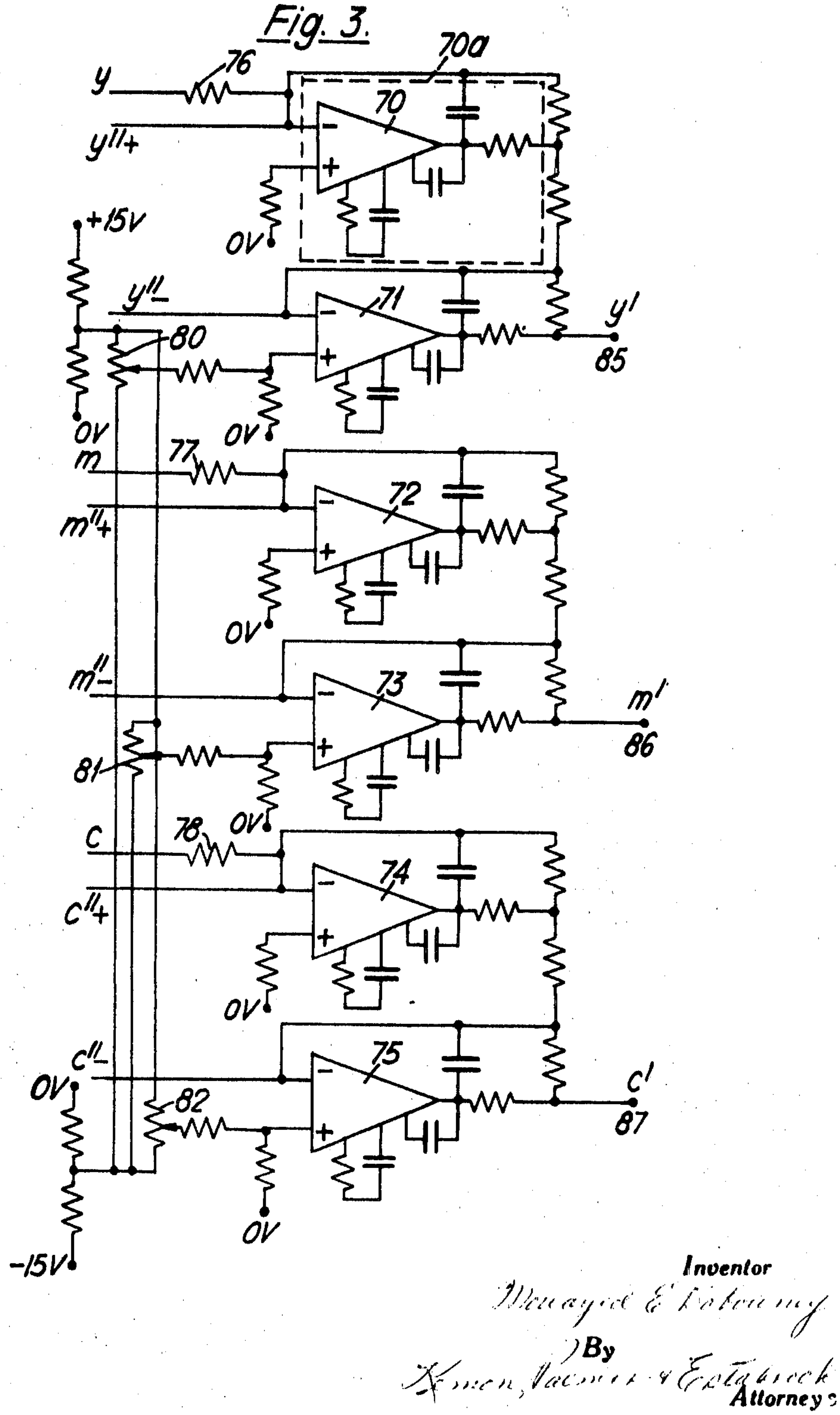
FIG. 3 shows the output of circuits of the color correction apparatus.

The six correction signals at the output terminals of FIG. 2 (the positive and negative yellow, magenta and cyan signals) are applied to the inverting inputs of six differential amplifiers 70 to 75 in the output circuits shown in FIG. 3. In the case of the differential amplifiers 70, 72 and 74, these inputs also receive through resistors 76, 77 and 78 the uncorrected yellow, magenta and cyan signals. The noninverting inputs of the differential amplifiers 71, 73, and 75 are connected to variable resistors 80, 81 and 82 which permit "offset" adjustments of these amplifiers, that is to say adjustments to correct the balance between the noninverting and inverting portions of the amplifiers.

The amplifiers 70 and 71 effect the addition of the uncorrected yellow signal and the signals on the positive and negative yellow correction lines and provide an output signal $y'$ at the terminal 85. Similarly, the differential amplifiers 72 and 73 provide a corrected magenta signal $m'$ at the output terminal 86 and the differential amplifiers 74 and 75 provide a corrected cyan signal $c'$ at the output terminal 87. These signals are used to expose the light-sensitive sheets from which the color printers will be read.

Although we have referred above to generating signals such as $p(y-m)$ and N($y-m$) at the output of the rectifiers 13 and 14, we prefer to generate instead:

$$\frac{P(y-m)}{1+k} \text{ and } \frac{N(y-m)}{1+k}$$

The parameter $k$ permits some variation of the correcting effect between pastel tones and solid colors. This modification is effected by the circuit shown in FIG. 4.

Figure 4:
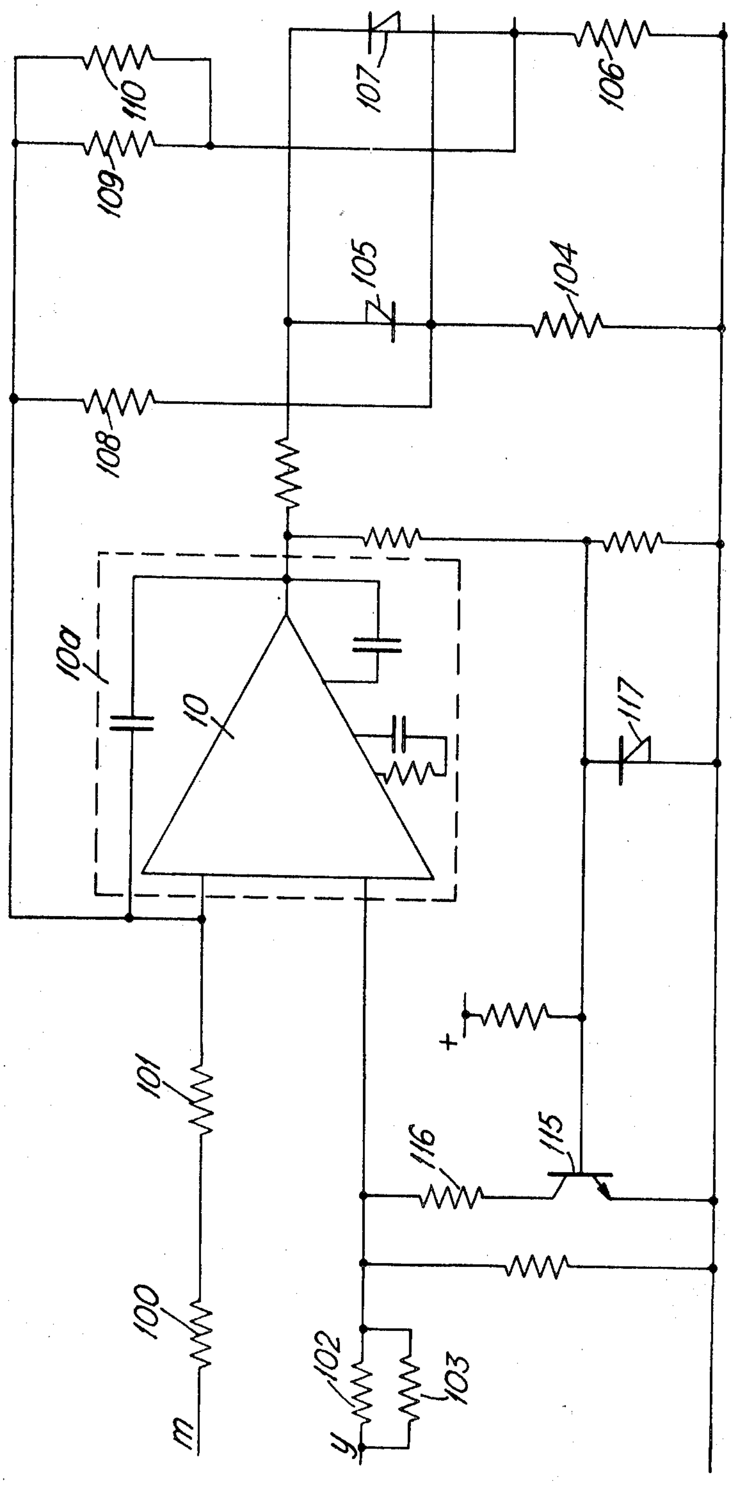
FIG. 4 is a more detailed diagram of a color correction function generator.

In FIG. 4, the integrated-circuit differential amplifier 10 has its inverting and noninverting inputs connected to the uncorrected magenta and yellow signal inputs, the magenta signal passing through two fixed resistors 100 and 101 totaling 10 kilohms. The yellow signal is applied to the noninverting input through a resistor 102 of 10 kilohms in parallel with the resistor 103 of 100 kilohms. The amplifier supplies an output load resistor 104 through a diode 105 if the amplifier output is positive and supplies an output load resistor 106 through a diode 107 if the amplifier output is negative. Separate feedback paths from the two output resistors control the amplifier gain. From junction of the resistor 104 and the diode 105, a feedback resistor 108 of 10 kilohms goes to the inverting input of the amplifier. From the junction of the resistor 106 and the diode 107 two feedback resistors 109 and 110 extend in parallel to the said inverting input, the resistor 109 having a value of 10 kilohms and the resistor 110 having a value of 100 kilohms. The value of the resistors 103 and 110 represent R/$k$ where R is the value (10 kilohms) of the resistors (100=101), 102, 108 and 109 and $k$ is a parameter which, in this case, has a value of 0.1.

The noninverting input of the differential amplifier is connected to the collector of a transistor 115, the emitter of which is connected to the zero line. The bias applied to the base of the transistor is chosen so that with earth potential at the output of the amplifier the transistor is partially switched. When the amplifier output is near earth potential it does not pass through either diode. The switching of the transistor places in or out of a circuit resistor 116, altering the gain of the noninverting part of the differential amplifier.

It may be shown that if the resistor 116 has a value:

R/$k$($k$+2) ($k$+3) then the positive and negative outputs of this circuit are $$\frac{P(y-m)}{1+k} \text{ and } \frac{N(y-m)}{1+k}$$

The diode 117 protects the transistor against excessive reverse base-to-emitter voltage. Parallel combinations of resistors can be replaced by equivalent single resistors. If desired, other resistor values may be used to result in output signals which, in comparison with those of the circuit shown, are larger or smaller relative to the input.

The two output load resistors must be small compared with the feedback resistors 108, 109, and 110. If this were not so, a spurious output would appear at the output line when the latter should be at zero volts, this spurious output being due to "feed forward" of the input signals through the feedback resistors.

The differential amplifiers are monolithic integrated circuits of the kind known as "Type 709". For example, they may be the differential amplifiers made by Fairchild Camera and Instrument Corporation under the designation $\mu$A709C. The components shown within the dotted boxes 10*a* (FIG. 4) and 70*a* (FIG. 3) are necessary to ensure high frequency stability of the amplifier and are connected to the amplifier in a well known manner.

Although we have referred above to the use of mixer networks such as 15, 16 to generate the sum of a number of inputs, in practice we incorporate weighting resistors into these summing networks so that for example the magenta signal described above as $P[(m-y)+N(y+c)]$ is more truly represented as $P[\alpha P(m-y)+\beta N(m-y)+\gamma N(y-c)]$ where $\alpha, \beta, \gamma$ depend on the chosen weighting resistors. By departing from unity in the values of $\alpha, \beta, \gamma$ it is possible to control the range of hue over which a magenta correction signal is produced. This is known as the "selectivity" of the magenta correction.

The selectivity of all the summing networks is chosen empirically to optimize the color correction for intermediate colors. Thus for example, orange is intermediate between yellow and red. The selectivity of the yellow and red correction is therefore chosen so that when an orange area is scanned, both yellow and red correction signals are generated but at a lower amplitude than those produced by scanning the respective pure colors. Thus, the orange area will be controlled jointly by the red and yellow controls and will receive correction intermediate between that applied to the yellow and to the red areas. Similar adjustments are made to give proper correction of the other intermediate colors.

The analyzing scanner which provides the uncorrected color signals at the input of the circuit described and the exposing scanner which uses the corrected output signals may be of conventional design.

It will be clear that the above-described circuit is susceptible to various modifications. As an example, in the circuit described diodes are used to select the weighted-sum correction signals only when they are positive. It will be appreciated that if a signal inversion had taken place prior to the diode the latter would have been oriented to select negative signals; furthermore, by the addition of a constant it can be arranged that the weighted-sum is always of one polarity so that only signals above a reference level or "false zero" are then selected. All such variations are intended to be included in the statement that the signals selected are of a polarity such that they increase with increasing color density of the corresponding restricted color range of the original. Furthermore, for some restricted applications correction of one of the color signals may be dispensed with and some of the difference signals may not be required.

I claim:

1. In apparatus for preparing color printers, for use in reproducing colored originals, including scanning means for scanning an original and generating individual electric signals varying with the densities of different color components of the successively scanned elements, the signals constituting uncorrected color printed signals, color signal channels having signal correction means, and exposure means, including an exposing source modulated in accordance with a corrected color printer signal, for scanning a sensitive surface, the signal-correction means comprising:

differencing circuits arranged to derive, for each of at least two pairs of uncorrected signals, a first difference signal representing an excess of a first of the pair of uncorrected signals over the second of the pair and a second difference signal representing an excess of the second of the pair of uncorrected signals over the first;

signal-combining means for deriving correction signals representing different restricted color ranges including for each such restricted color range, summing means for forming a weighted sum of at least two of said difference signals from said differencing circuits and selector means for selecting said weighted-sum signal only when it has a predetermined polarity, and means for correcting at least two of the said uncorrected color printer signals each with at least one of the correction signals from said signal-combining means.

2. Apparatus in accordance with claim 1, including for each color printer channel a manually adjustable control for increasing the color signal for that channel scanned elements having predominantly the color of the said color printer.

3. Apparatus in accordance with claim 2, including for each color printer channel, a manually adjustable control for decreasing the color signal in that channel for scanned elements having predominantly the color of one of the other color printers.

4. Apparatus in accordance with claim 1, in which the signal-combining means derives correction signals representing restricted color ranges corresponding to the printer colors and also further correction signal representing restricted color ranges corresponding to overprints of the printer colors.

5. Apparatus in accordance with claim 4, including for each printer color channel attenuating controls for the correction signals corresponding to each of the other printer colors and for the correction signal corresponding to the overprint of the said other printer colors.

6. Apparatus in accordance with claim 4, including for each color printer channel a boost control for the correction signal corresponding to the printer color and for the correction signal corresponding to overprints of this printer color and each of the other printer colors.

7. Apparatus in accordance with claim 2, in which said control is an adjustable resistance and in which a further resistor is so connected to said adjustable resistance that the adjustable resistance provides variation on each side of a mean value determined by the parallel-connected further resistor.

8. Apparatus in accordance with claim 7, in which said further resistor is mounted for easy replacement to permit the substitution of resistors of other values to give different means values.

9. Apparatus is accordance with claim 1, in which said differencing circuits include means whereby the first difference signal represents an excess of the first of the pair of uncorrected signals, after division by a factor $(1+k)$, over the second of the pair, and the second difference signal represents an excess of the second of the pair of uncorrected signals, after division by a factor c$1+k$), over the first, variation of the parameter $k$ permitting variation of the correcting effect between pastel tones and solid colors.

10. Apparatus in accordance with claim 9, in which each difference signal is generated by a function generator including a differential amplifier connected to receive through a first resistor a first of the signals and to receive at its other input, through a resistance equal to the first resistance divided by $(1+k)$the second of the pair of signals, the output of the amplifier being connected back to its input through a feedback resistance equal to the value of the first resistance.